US007011301B2

(12) United States Patent
Oldenettel

(10) Patent No.: US 7,011,301 B2
(45) Date of Patent: Mar. 14, 2006

(54) WHEEL-GUIDING FORWARD AXLE AIR SPRING STRUT

(75) Inventor: Holger Oldenettel, Resse (DE)

(73) Assignee: Continental Aktiengesellschaft, Hannover (DE)

( * ) Notice: Subject to any disclaimer, the term of this patent is extended or adjusted under 35 U.S.C. 154(b) by 0 days.

(21) Appl. No.: 10/841,436

(22) Filed: May 10, 2004

(65) Prior Publication Data

US 2004/0222576 A1 Nov. 11, 2004

(30) Foreign Application Priority Data

May 8, 2003 (DE) ................................ 103 20 501

(51) Int. Cl.
*F16F 9/04* (2006.01)
*F16F 9/36* (2006.01)

(52) U.S. Cl. ............................ 267/64.23; 188/322.12; 188/322.16; 267/64.21

(58) Field of Classification Search ............ 267/64.11, 267/64.19, 64.21, 64.23, 64.24, 64.27, 64.26, 267/220; 188/322.12, 322.16; 280/124.155
See application file for complete search history.

(56) References Cited

U.S. PATENT DOCUMENTS

| | | | | |
|---|---|---|---|---|
| 4,482,135 A | | 11/1984 | Ishida et al. | 267/220 |
| 4,655,438 A | | 4/1987 | Cameron | 267/220 |
| 4,690,425 A | * | 9/1987 | Kubo | 280/124.155 |
| 5,009,401 A | * | 4/1991 | Weitzenhof | 267/64.21 |
| 5,669,597 A | * | 9/1997 | Rittstieg et al. | 267/64.17 |
| 5,690,319 A | * | 11/1997 | Robinson et al. | 267/64.19 |

FOREIGN PATENT DOCUMENTS

| | | | |
|---|---|---|---|
| DE | 36 24 296 | | 2/1987 |
| DE | 196 07 804 | | 5/1997 |
| DE | 197 53 637 | | 6/1998 |
| DE | 100 38 267 | | 2/2002 |
| DE | 102 21 894 | | 12/2003 |
| JP | 231907 A | * | 2/1990 |

OTHER PUBLICATIONS

"Fahrwerkstechnik: Stoss- und Schwingungsdämpfer", by Reimpel, Vogel-Verlag (1989), p. 229.

* cited by examiner

*Primary Examiner*—Melody M. Burch
(74) *Attorney, Agent, or Firm*—Walter Ottesen

(57) ABSTRACT

A wheel-guiding forward axle spring strut includes a spring and a shock absorber (6) integrated axially therein. The spring includes two end members (8, 10) and a spring element is disposed between these end members. The shock absorber (6) includes a shock absorber cylinder (20) and a shock absorber rod (18) connected to the chassis (24) via a non-rotatable shock absorber bearing (22) The end member (8) is connected by a rotational bearing (28) to the chassis. The lower spring end member (10) is fixedly connected to the shock absorber cylinder (20) and thereby in common to the forward axle. The upper spring end member is an air spring cover and the lower spring end member is an air spring piston (10) and an air spring flexible member (12) is mounted between the cover (8) and the piston (10) so as to be pressure-tight and tension-tight. The bearing (28) and a seal (30) are arranged between the air spring cover (8) and the non-rotatable component The bearing (28) and the seal (30) can be loaded in rotation in correspondence to a wheel moved to steer a vehicle.

10 Claims, 3 Drawing Sheets

WHEEL-GUIDING FORWARD AXLE AIR SPRING STRUT

CROSS REFERENCE TO RELATED APPLICATION

This application claims priority of German patent application no. 103 20 501.2, filed May 8, 2003, the entire content of which is incorporated herein by reference.

BACKGROUND OF THE INVENTION

A wheel-guiding forward axle spring strut is disclosed in U.S. Pat. No. 4,482,135.

Wheel-guiding spring struts are often mounted on the forward axle of passenger cars. Because the wheel is attached directly to the shock absorber cylinder, a torsion of the cylinder relative to the chassis occurs when the vehicle is steered. This torsion must be taken up by a pivot bearing.

The spring strut is supported by a ball bearing on the chassis. All forces (deflection amplitude-dependent spring forces and deflection speed-dependent shock absorber forces), which are generated in the spring strut, are directed through the bearing. For this reason, the bearing is loaded in compression as well as in tension and must take up high force peaks.

In order to maintain the bearing loads within acceptable limits, often only the spring and not the complete spring strut is supported by a pivot bearing. The rotational movement between the shock absorber cylinder and the shock absorber rod is, in this case, taken up by the seal of the shock absorber; that is, the shock absorber rod is connected directly to the chassis.

Taking up the rotation movement by the shock absorber is made possible by a rotationally-symmetrical configuration of the shock absorber piston and the shock absorber cylinder.

A separation of the spring rotation movement from the shock absorber rotational movement has been realized up to now only with helical spring struts. In this connection, reference can be made, for example, to U.S. Pat. No. 4,482,135 and the other state of the art referred to therein.

In air spring struts, up to now, all forces have been conducted via a single spring pivot bearing. In this connection, reference can be made to the article of Reimpel entitled "Fahrwerkstechnik: Stoβ-und Schwingungsdämpfer", Vogel-Verlag (1989), page 229, as well as German patent publications 196 07 804 and 197 53 637. Such a pivot bearing must be designed to be correspondingly robust for the above-mentioned reasons. A separate configuration of spring pivot bearing and shock absorber pivot bearing could, up to now, not be realized because of sealing problems in the head region of the air spring.

SUMMARY OF THE INVENTION

It is an object of the invention to provide a wheel-guiding forward axle air spring strut which solves the above sealing problem.

The wheel-guiding forward axle air spring strut of the invention is for a motor vehicle having a chassis. The air spring strut includes: an air spring including: an air spring cover defining a longitudinal axis; an air spring piston; and, an air spring flexible member connected pressure-tight and tension-tight between the air spring cover and the air spring piston; a shock absorber integrated axially into the air spring; the shock absorber including: a shock absorber cylinder; and, a shock absorber rod axially displaceable and rotatable in the shock absorber cylinder; a non-rotatable support and the shock absorber rod being articulately connected to the chassis via the non-rotatable support; the non-rotatable support and the air spring cover conjointly defining an interface; a rotational bearing mounted at the interface so as to permit the air spring cover to rotate about the longitudinal axis; a seal also mounted at the interface; and, the rotational bearing and the seal being so configured that they can be subjected to torsion when the wheel is turned for steering the motor vehicle.

As noted above, a seal is provided between the shock absorber support and the air spring cover which can be loaded in torsion in correspondence to the turning of the wheel for steering. As in helical spring struts, the damping forces are transmitted directly from the shock absorber to the chassis with a rubber bumper being disposed therebetween. In this way, the force peaks, which act on the rotational bearing, are reduced. The rotational bearing can be smaller, lighter and more cost effective.

Since no tension forces act on the rotational bearing, a simplified assembly and a simplified attachment result.

The rotational bearing can be configured as a cost effective plastic slide bearing because the rotational bearing does not have to withstand large loads. Plastic rotational bearings are significantly more cost effective and are lighter and more compact. The rotational bearing is disposed within the pressure space of the air spring because of an arrangement of the seal above this rotational bearing. The rotational bearing is protected against contaminants in this pressure space and therefore a long service life can be expected.

The favorable material characteristics, especially a low friction value, can be exploited by integrating the seal in the slide bearing. High-quality plastics having a graphite filling are, inter alia, used for the slide bearing.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
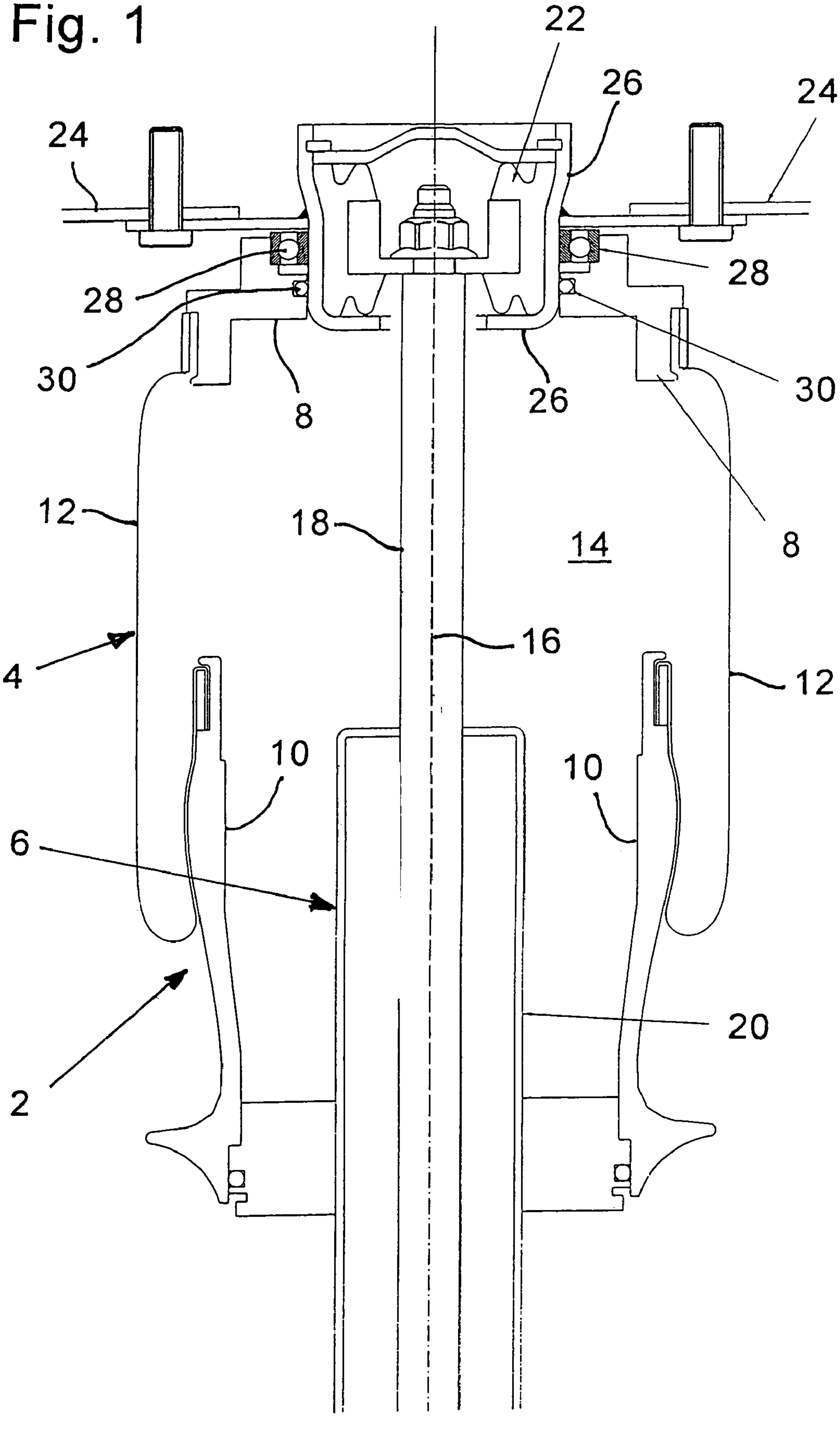
FIG. 1 is a longitudinal section view through an air spring strut in accordance with the invention.

The air spring strut 2 includes an air spring 4 and a shock absorber 6 arranged coaxially thereto. The air spring 4 includes two end members (8, 10) which are spaced from each other at a distance which varies. The end members (8, 10) are here an air spring cover 8 and a roll-off piston 10. The cover 8 and roll-off piston 10 are connected pressure-tight and tension-tight to each other by an air spring flexible member 12. Cover 8, piston 10 and flexible member 12 conjointly enclose an air spring pressure space 14. The shock absorber 6 is disposed on the longitudinal axis 16 of the air spring 4 and this shock absorber is an integral part of the air spring strut 2. The shock absorber 6 includes a shock absorber rod 18 and a shock absorber cylinder 20. The shock absorber rod 18 and a shock absorber piston (not shown) are configured to be rotationally symmetrical like the cylindrical inner wall of the shock absorber cylinder 20 so that the rod

18 can not only execute axial movements but also rotational movements relative to the cylinder 20.

The upper end of the shock absorber rod 18 is embedded non-rotatably in a rubber block 22 functioning as a shock absorber bearing or support which is disposed in a housing 26 mounted rigidly to the chassis 24.

The shock absorber cylinder 20 is connected rigidly to an assigned wheel axle (not shown).

The rotatable and seal-tight journalling of the air spring cover 8 on the outer wall of the shock absorber rod housing 26 is of significance for the invention.

FIG. 1 shows the configuration of such a journalling which, in the present embodiment, includes a ball bearing 28 and an annularly-shaped seal 30.

Figure 2:
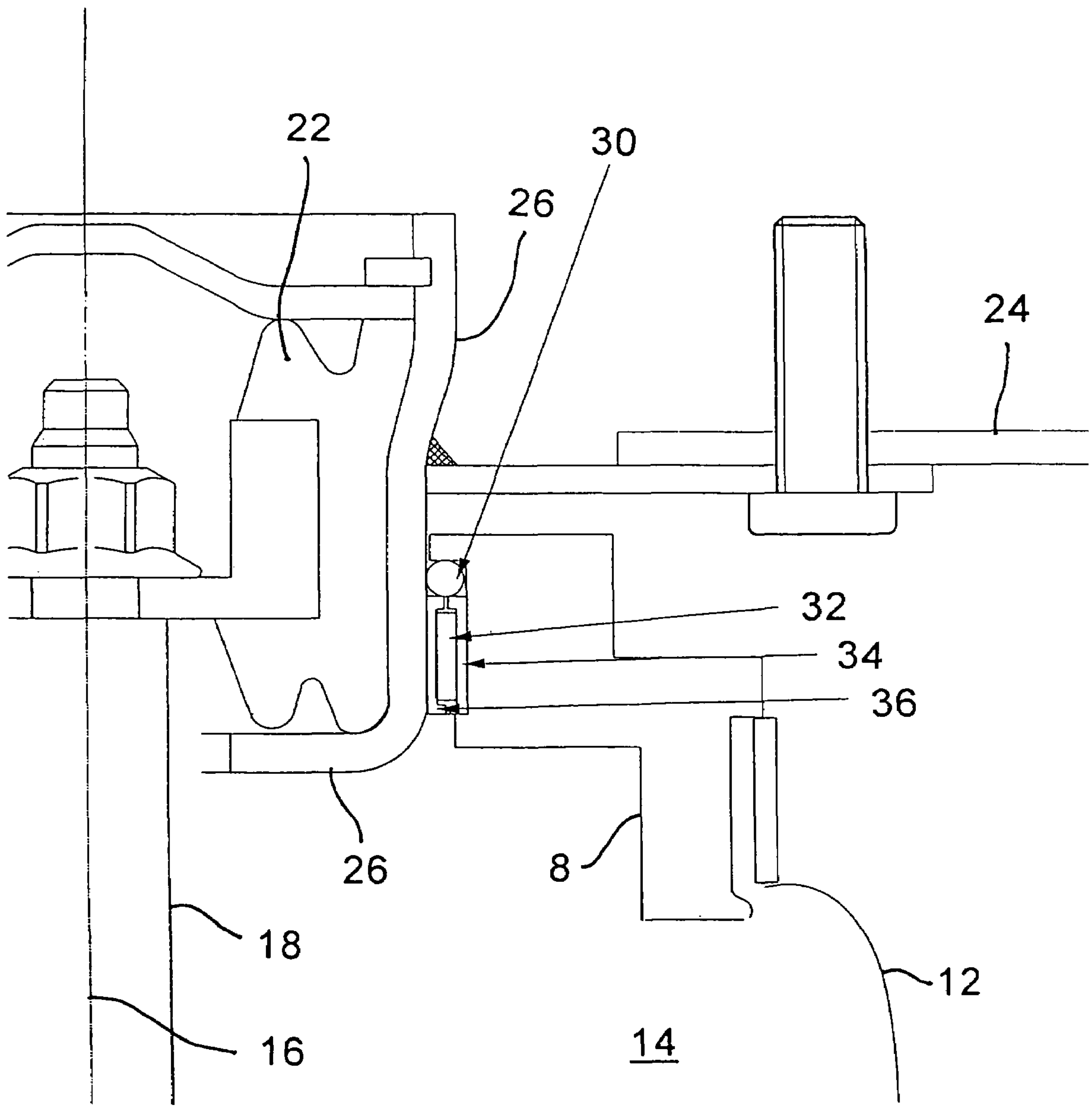
FIG. 2 is a section view through the head region of a modified air spring strut according to another embodiment of the invention; and, FIG. 3 is a section view through the head region of another embodiment of the air spring strut of the invention.

The embodiment shown in FIG. 2 likewise includes an annularly-shaped seal 30 and a slide ring 32 in lieu of a ball bearing. The slide ring 32 is embedded between an outer bearing collar 34 and an inner bearing collar 36. The seal 30 can be configured as a shaft seal.

Figure 3:
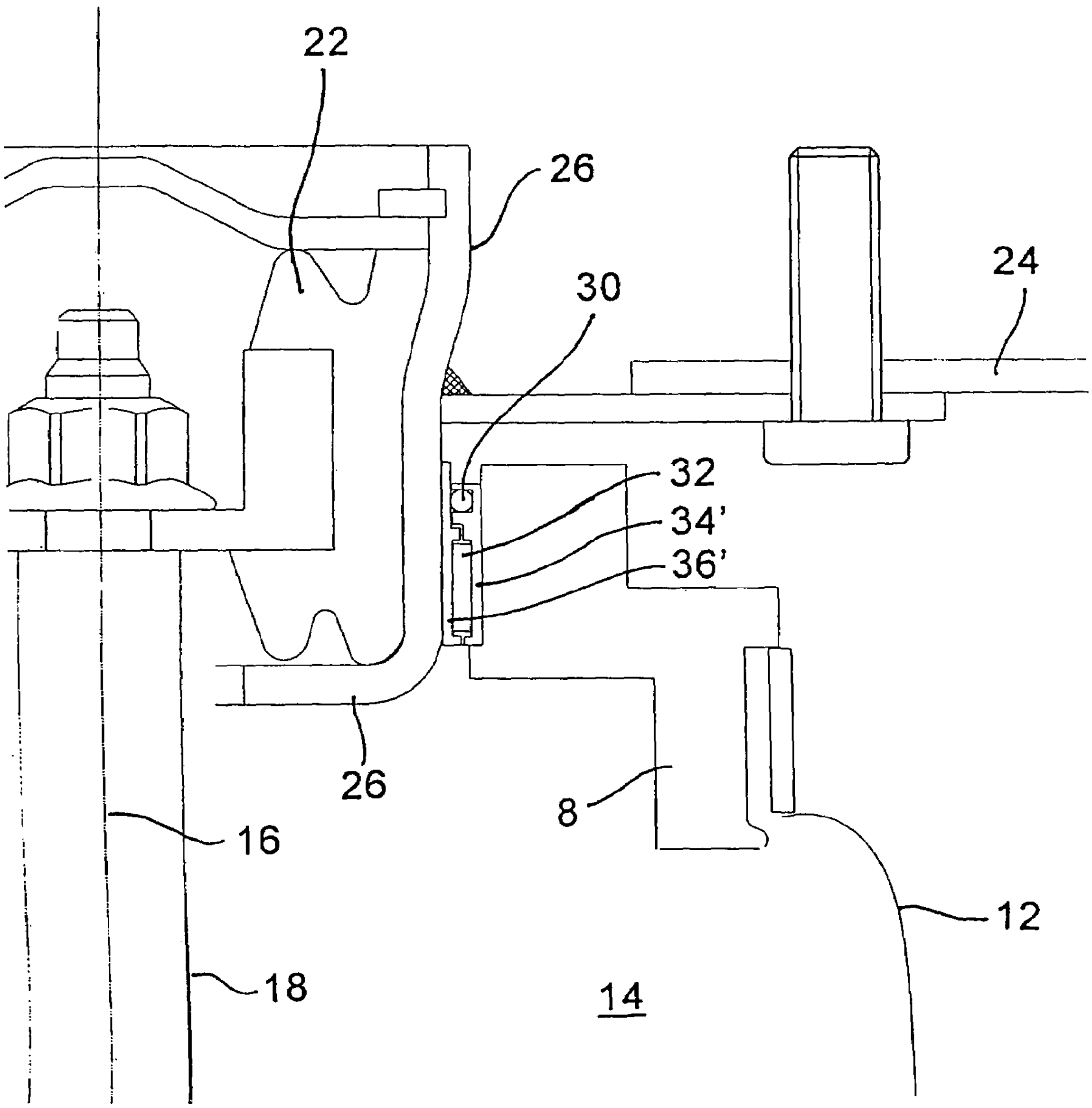

The embodiment shown in FIG. 3 likewise shows an annularly-shaped seal 30 and a slide ring 32 as a rotational bearing.

While the sealing ring 30, which is shown in FIG. 2, is disposed directly between the shock absorber rod housing 26 on the one hand and the air spring cover on the other hand, the sealing ring 30 together with the slide ring 32 in FIG. 3 is embedded in a common two-part bearing shell (34', 36').

It is understood that the foregoing description is that of the preferred embodiments of the invention and that various changes and modifications may be made thereto without departing from the spirit and scope of the invention as defined in the appended claims.

What is claimed is:

1. A forward axle air spring strut for guiding a wheel in a motor vehicle having a chassis, the air spring strut comprising:

an air spring including: an air spring cover defining a longitudinal axis; an air spring piston; and, an air spring flexible member connected pressure-tight and tension-tight between said air spring cover and said air spring piston;

a shock absorber integrated axially into said air spring;

said shock absorber including: a shock absorber cylinder; and, a shock absorber rod axially displaceable and rotatable in said shock absorber cylinder;

a non-rotatable elastic support connected to said chassis and said shock absorber rod being articulately connected to said chassis via said non-rotatable elastic support;

said non-rotatable elastic support and said air spring cover conjointly defining an interface;

a rotational bearing for connecting said air spring to said chassis separately from said shock absorber;

said rotational bearing being mounted at said interface so as to permit said air spring to rotate about said longitudinal axis relative to said non-rotatable support and said shock absorber;

a seal also mounted at said interface;

said rotational bearing and said seal being mounted so that said bearing and said seal can be subjected to torsion when the wheel is turned for steering said motor vehicle;

said cover, said piston and said air spring flexible member conjointly defining a pressure space;

said seal being mounted above said rotational bearing; and, said rotational bearing being mounted in said pressure space of said air spring.

2. The air spring strut of claim 1, wherein said seal is configured as an annular element having a circular cross section.

3. The air spring strut of claim 1, wherein said seal is configured as a shaft seal.

4. The air spring strut of claim 1, wherein said rotational bearing is a plastic slide bearing.

5. The air spring strut of claim 4, wherein said seal is integrated into said slide bearing.

6. A forward axle air spring strut for guiding a wheel in a motor vehicle having a chassis, the air spring strut comprising:

an air spring including: an air spring cover defining a longitudinal axis; an air spring piston; and, an air spring flexible member connected pressure-tight and tension-tight between said air spring cover and said air spring piston;

a shock absorber integrated axially into said air spring;

said shock absorber including: a shock absorber cylinder; and, a shock absorber rod axially displaceable and rotatable in said shock absorber cylinder;

a housing fixedly connected to said chassis;

an elastic support non-rotatably seated in said housing so as to be non-rotatable with respect to said housing and said chassis;

said shock absorber rod being articulately connected to said chassis via said non-rotatable support and said housing;

said housing and said air spring cover conjointly defining an interface;

a rotational bearing for connecting said air spring to said chassis separately from said shock absorber via said housing;

said rotational bearing being mounted at said interface so as to permit said air spring to rotate about said longitudinal axis relative to said non-rotatable support and said shock absorber;

a seal also mounted at said interface;

said rotational bearing and said seal being mounted so that said bearing and said seal can be subjected to torsion when the wheel is turned for steering said motor vehicle;

said cover, said piston and said air spring flexible member conjointly defining a pressure space;

said seal being mounted above said rotational bearing; and, said rotational bearing being mounted in said pressure space of said air spring.

7. The air spring strut of claim 6, wherein said seal is configured as an annular element having a circular cross section.

8. The air spring strut of claim 6, wherein said seal is configured as a shaft seal.

9. The air spring strut of claim 6, wherein said rotational bearing is a plastic slide bearing.

10. The air spring strut of claim 9, wherein said seal is integrated into said slide bearing.

* * * * *